United States Patent
Bostamam et al.

(10) Patent No.: US 11,172,152 B2
(45) Date of Patent: Nov. 9, 2021

(54) IMAGING DEVICE WHICH PERFORMS IMAGING AT A HIGH RESOLUTION FOR A PIXEL ROW IN A STATE IN WHICH MOTION IS DETECTED

(71) Applicant: SONY SEMICONDUCTOR SOLUTIONS CORPORATION, Kanagawa (JP)

(72) Inventors: Anas Bostamam, Kanagawa (JP); Tomohiro Baba, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/961,075

(22) PCT Filed: Oct. 15, 2018

(86) PCT No.: PCT/JP2018/038320
§ 371 (c)(1),
(2) Date: Jul. 9, 2020

(87) PCT Pub. No.: WO2019/146178
PCT Pub. Date: Aug. 1, 2019

(65) Prior Publication Data
US 2021/0067722 A1 Mar. 4, 2021

(30) Foreign Application Priority Data
Jan. 29, 2018 (JP) .............................. JP2018-012135

(51) Int. Cl.
*H04N 5/3745* (2011.01)
*H04N 5/232* (2006.01)
(Continued)

(52) U.S. Cl.
CPC ....... *H04N 5/3745* (2013.01); *H04N 5/23212* (2013.01); *H04N 5/343* (2013.01); *H04N 5/3454* (2013.01); *H04N 5/3456* (2013.01)

(58) Field of Classification Search
CPC .. H04N 5/3745; H04N 5/23212; H04N 5/343; H04N 5/3454; H04N 5/3456; H04N 5/232
See application file for complete search history.

(56) References Cited

U.S. PATENT DOCUMENTS 7,876,980 B2 * 1/2011 Chiba .................. H04N 5/3456
382/315
8,139,121 B2 * 3/2012 Ito ...................... H04N 5/23245
348/222.1

(Continued)

FOREIGN PATENT DOCUMENTS

JP 2006-166400 A 6/2006
JP 2007-228019 A 9/2007
(Continued)

OTHER PUBLICATIONS

International Search Report and Written Opinion of PCT Application No. PCT/JP2018/038320, dated Nov. 20, 2018, 09 pages of ISRWO.

*Primary Examiner* — Luong T Nguyen
(74) *Attorney, Agent, or Firm* — Chip Law Group

(57) ABSTRACT

Power consumption of an imaging element which outputs only a region of interest (ROI) at high resolution is reduced. In a two-dimensional pixel array in which pixel rows arranged in a predetermined direction are arranged in a direction perpendicular to the predetermined direction, the imaging element performs imaging at high resolution for a first pixel row including a predetermined region and performs imaging at low resolution for a second pixel row other than this. The first image processing unit generates an image (Continued)

of a predetermined region on the basis of an imaging signal of the first pixel row. A pixel adding unit performs an adding process between pixels on the imaging signal of the first pixel row to make resolution the same as resolution of the imaging signal of the second pixel row. The second image processing unit generates an image of an entire region on the basis of the imaging signal of the second pixel row and the imaging signal of the first pixel row subjected to the adding process.

10 Claims, 18 Drawing Sheets

(51) Int. Cl.
*H04N 5/343* (2011.01)
*H04N 5/345* (2011.01)

(56) References Cited

U.S. PATENT DOCUMENTS

| | | | |
|---|---|---|---|
| 9,420,175 B2 * | 8/2016 | Furukawa | G06T 5/002 |
| 2004/0141067 A1 * | 7/2004 | Nakayama | H04N 5/343 |
| | | | 348/222.1 |
| 2006/0119903 A1 | 6/2006 | Chiba et al. | |
| 2007/0195182 A1 | 8/2007 | Ito | |
| 2010/0141783 A1 * | 6/2010 | Sakaguchi | H04N 5/343 |
| | | | 348/222.1 |

FOREIGN PATENT DOCUMENTS

| | | |
|---|---|---|
| JP | 2007-281961 A | 10/2007 |
| JP | 2013-084124 A | 5/2013 |
| JP | 2016-219949 A | 12/2016 |

* cited by examiner

*FIG. 4*
TIME T3
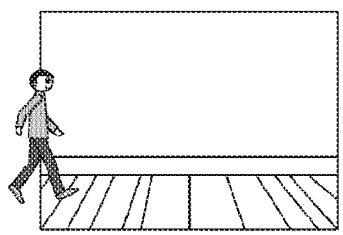 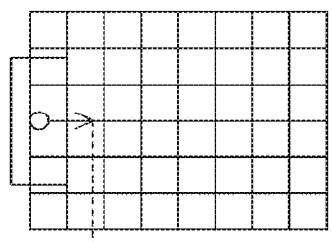  ESTIMATE MOVING BODY GRAVITY CENTER
TIME T4
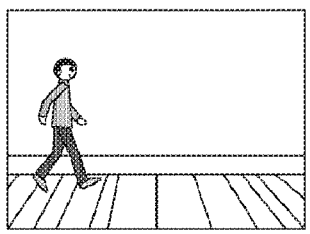 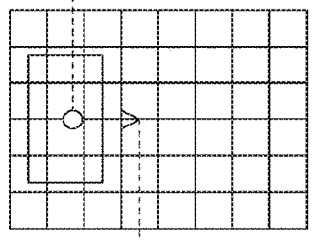  ESTIMATE DIRECTION AND SPEED OF MOVING BODY GRAVITY CENTER
TIME T5
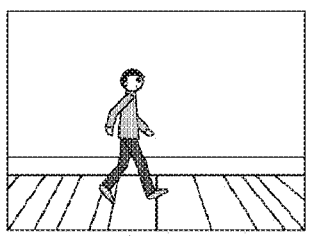 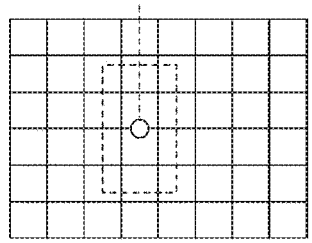
PREDICT MOVING BODY GRAVITY CENTER AND REGION

IMAGING DEVICE WHICH PERFORMS IMAGING AT A HIGH RESOLUTION FOR A PIXEL ROW IN A STATE IN WHICH MOTION IS DETECTED

CROSS REFERENCE TO RELATED APPLICATIONS

This application is a U.S. National Phase of International Patent Application No. PCT/JP2018/038320 filed on Oct. 15, 2018, which claims priority benefit of Japanese Patent Application No. JP 2018-012135 filed in the Japan Patent Office on Jan. 29, 2018. Each of the above-referenced applications is hereby incorporated herein by reference in its entirety.

TECHNICAL FIELD

The present technology relates to an imaging device. Specifically, the present technology relates to an imaging device including an imaging element which takes an image and a control method of the imaging element.

BACKGROUND ART

When performing image processing and the like, processing is sometimes performed while focusing on a specific region in an image. The region in this case is referred to as a region of interest (ROI). In the imaging device, it is expected that power consumption is reduced by performing imaging only in such a specific region. Therefore, for example, an imaging device which discriminates a target object region in a first image obtained by a first imaging unit, and controls a second imaging unit according to the target object region to obtain a second image is suggested (for example, refer to Patent Document 1).

CITATION LIST

Patent Document

Patent Document 1: Japanese Patent Application Laid-Open No. 2016-219949

SUMMARY OF THE INVENTION

Problems to be Solved by the Invention

In the above-described conventional technology, it has been controlled to take an image according to the target object region. However, since the first image for discriminating the target object region and the second image corresponding to the target object region are imaged separately, there is a possibility that the power consumption is not sufficiently reduced.

The present technology is achieved in view of such a situation, and an object thereof is to reduce power consumption of an imaging element which outputs only a region of interest at high resolution.

Solutions to Problems

The present technology is achieved for solving the above-described problem, and a first aspect thereof is an imaging device including an imaging element that performs imaging at predetermined resolution for a first pixel row including a predetermined region and performs imaging at resolution lower than the predetermined resolution for a second pixel row other than the first pixel row in a two-dimensional pixel array in which pixel rows arranged in a predetermined direction are arranged in a direction perpendicular to the predetermined direction, a first image processing unit that generates an image of the predetermined region on the basis of an imaging signal of the first pixel row, a pixel adding unit that performs an adding process between pixels on the imaging signal of the first pixel row to make resolution the same as resolution of an imaging signal of the second pixel row, and a second image processing unit that generates an image of an entire region on the basis of the imaging signal of the second pixel row and the imaging signal of the first pixel row subjected to the adding process; and a controlling method of the imaging element. This brings an effect of reducing power consumption of the imaging element by imaging only the predetermined region at high resolution to output, and taking the image of the entire region at low/high resolution.

Furthermore, the first aspect may further include a motion detection processing unit that detects motion according to a change in time series of the image of the entire region, and a control unit that controls the imaging element to image the first pixel row while making a region in which the motion is detected the predetermined region. This brings an effect of detecting the motion in the image of the entire region taken at low/high resolution to follow the same as the predetermined region.

Furthermore, in the first aspect, the control unit may control the imaging element to increase a frame rate when a transition is made from a state in which the motion is not detected to a state in which the motion is detected. This brings an effect of increasing the frame rate and performing region prediction.

Furthermore, in the first aspect, the control unit may control the imaging element to change a frame rate according to a moving speed of the region in which the motion is detected. This brings an effect of dynamically changing the frame rate according to the moving speed.

Furthermore, in the first aspect, in a case where a plurality of moving bodies of different moving speeds is detected in the image of the entire region, the control unit may control the imaging element to image the first pixel row while making a region including the moving bodies the predetermined region. This brings an effect of collectively handle the plurality of moving bodies.

Furthermore, the first aspect may further include an exposure evaluation value generating unit that generates an exposure evaluation value on the basis of the region in which the motion is detected in the image of the entire region, in which the control unit may control the imaging element to perform exposure on the basis of the exposure evaluation value. This brings an effect of performing the exposure on the basis of the region in which the motion is detected.

Furthermore, in the first aspect, in a state in which the motion is detected, the imaging element may alternately repeat a first frame period in which the imaging at the predetermined resolution is performed for the first pixel row and the imaging is not performed for the second pixel row, and a second frame period in which the imaging is performed at resolution lower than the predetermined resolution for all the pixel rows. This brings an effect of making control of the pixel row common for each frame period.

Furthermore, in the first aspect, the imaging element may perform the imaging at the predetermined resolution for the first pixel row only in a state in which the motion is detected. This brings an effect of driving by an event of motion detection.

Furthermore, the first aspect may further include an output processing unit that outputs the image of the predetermined region generated by the first image processing unit. This brings an effect of outputting only the image of the predetermined region.

Effects of the Invention

The present technology may have an excellent effect of reducing power consumption of an imaging element which outputs only a region of interest at high resolution. Note that, the effects are not necessarily limited to the effects herein described and may be any effect described in the present disclosure.

BRIEF DESCRIPTION OF DRAWINGS

FIG. 4 is a view illustrating an example of region prediction in the embodiment of the present technology.

MODE FOR CARRYING OUT THE INVENTION

A mode for carrying out the present technology (hereinafter, referred to as an embodiment) is hereinafter described. The description is given in the following order.

1. Configuration (Configuration example of imaging device)
2. Operation (Operation example of imaging device)
3. Circuit (Mounting example of pixel driving)

<1. Configuration>

[Configuration of Imaging Device]

Figure 1:
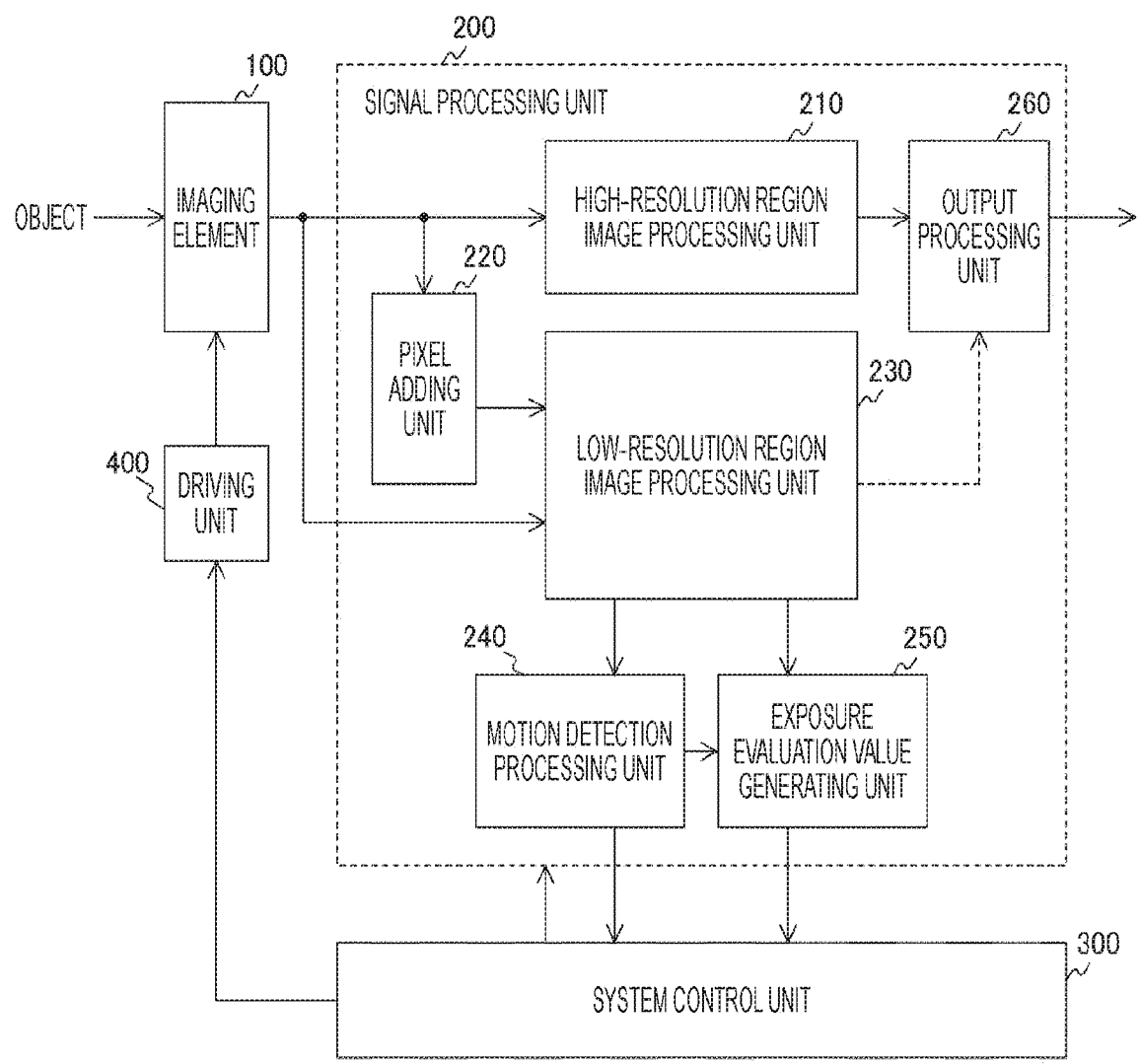
FIG. 1 is a view illustrating a configuration example of an imaging device in an embodiment of the present technology.

FIG. 1 is a view illustrating a configuration example of an imaging device of an embodiment of the present technology. The imaging device includes an imaging element 100, a signal processing unit 200, a system control unit 300, and a driving unit 400.

The imaging element 100 is a pixel array in which pixels for imaging an object are two-dimensionally arranged. The imaging element 100 forms the pixel array by arranging pixel rows arranged in a predetermined direction in a direction perpendicular to the predetermined direction. The pixel row is generally a line or a line group arranged in a horizontal direction, and exposure and imaging are performed in units of this pixel row. However, it is also possible to arrange the pixel row in a vertical direction to perform the exposure and imaging.

The imaging element 100 is driven by the driving unit 400 under the control of the system control unit 300. The imaging element 100 performs normal imaging at high resolution for a region of interest (ROI), and performs sensing imaging at low resolution for other regions.

Here, the normal imaging is imaging for recording, displaying and the like an image, and for imaging at high resolution such as 2560 pixels×1440 pixels, for example. In this normal imaging, a high bit rate of, for example, about 10 bits is assumed at the time of A/D conversion with a normal dynamic range of about 60 dB. Furthermore, for example, color imaging such as RGB is assumed. Furthermore, a high frame rate of about 60 fps (frames/second) is assumed.

In contrast, the sensing imaging is imaging for detecting a moving body, and for imaging at low resolution such as 16 pixels×5 pixels, for example. In this sensing imaging, a low bit rate of, for example, about 8 bits is assumed at the time of A/D conversion with a high dynamic range of about 100 dB. Furthermore, a low frame rate of about 30 fps by monochrome imaging is assumed.

Note that, as described later, in the imaging element 100, imaging is performed not in units of region but in units of pixel row, so that the pixel row including the ROI is read at high resolution, and then the resolution thereof is reduced by pixel addition.

The signal processing unit 200 performs signal processing on an imaging signal read from the imaging element 100. The signal processing unit 200 includes a high-resolution region image processing unit 210, a pixel adding unit 220, a low-resolution region image processing unit 230, a motion detection processing unit 240, an exposure evaluation value generating unit 250, and an output processing unit 260.

The high-resolution region image processing unit 210 performs signal processing for the ROI subjected to the normal imaging at high resolution by the imaging element 100. Note that, the high-resolution region image processing unit 210 is an example of a first image processing unit recited in claims.

The pixel adding unit 220 performs the pixel addition for the pixel row subjected to the normal imaging at high resolution by the imaging element 100 to reduce the resolution thereof. A result by the pixel adding unit 220 is supplied to the low-resolution region image processing unit 230.

The low-resolution region image processing unit 230 performs signal processing on an imaging signal of the sensing imaging at low resolution by the imaging element 100 and an imaging signal resolution of which is reduced by the pixel adding unit 220. The low-resolution region image processing unit 230 performs the signal processing for an entire region at low resolution obtained by combining the imaging signal of the sensing imaging at low resolution by the imaging element 100 and the imaging signal the resolution of which is reduced by the pixel adding unit 220. Note that, the low-resolution region image processing unit 230 is an example of a second image processing unit recited in claims.

The motion detection processing unit 240 detects motion in accordance with a change in time series of the image of the entire region subjected to the signal processing by the low-resolution region image processing unit 230. A region in which the motion is detected by the motion detection processing unit 240 is supplied to the system control unit 300 and the exposure evaluation value generating unit 250.

The exposure evaluation value generating unit 250 generates an exposure evaluation value (auto exposure (AE)) evaluation value) for exposure control. The exposure evaluation value generating unit 250 generates the exposure evaluation value on the basis of the region in which the motion is detected by the motion detection processing unit 240 in the image of the entire region subjected to the signal processing by the low-resolution region image processing unit 230. The exposure evaluation value generated by the exposure evaluation value generating unit 250 is supplied to the system control unit 300.

The output processing unit 260 outputs an imaging signal of the ROI subjected to the signal processing by the high-resolution region image processing unit 210 to subsequent processing. Here, as the subsequent processing, for example, display control for outputting to a display device, recording control for recording on a recording medium and the like are assumed. Note that, it is herein assumed that the imaging signal of the ROI is output, but it is also possible to output the imaging signal of the image of the entire region subjected to the signal processing by the low-resolution region image processing unit 230.

The system control unit 300 controls an entire imaging device. The system control unit 300 controls, for example, to image the region in which the motion is detected by the motion detection processing unit 240 at high resolution as the ROI. Furthermore, the system control unit 300 controls to image on the basis of the exposure evaluation value generated by the exposure evaluation value generating unit 250, for example. Note that, the system control unit 300 is an example of a control unit recited in claims.

The driving unit 400 drives the imaging element 100 under the control of the system control unit 300.

<2. Operation>

[Basic Operation]

Figure 2:
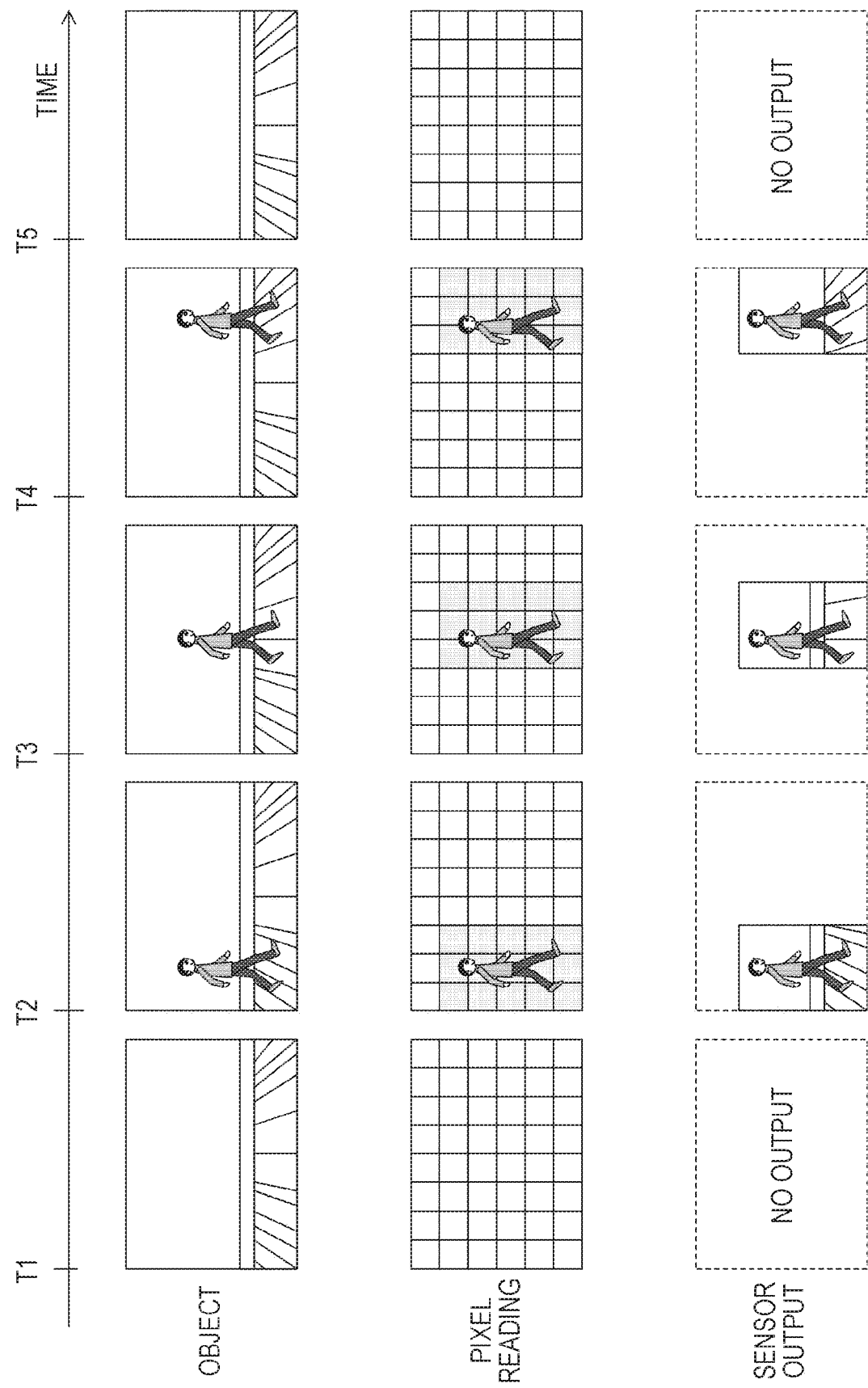
FIG. 2 is a view illustrating a basic operation example of the imaging device in the embodiment of the present technology.

FIG. 2 is a view illustrating a basic operation example of the imaging device in the embodiment of the present technology.

In this example, the moving body is detected in the object from time T2 to time T4. The imaging element 100 makes the region in which the motion is detected by the motion detection processing unit 240 the ROI and performs pixel reading at high resolution for the pixel row including the ROI. In contrast, pixel reading at low resolution is performed for the pixel row not including the ROI.

The high-resolution region image processing unit 210 performs the signal processing for the ROI subjected to the normal imaging at high resolution by the imaging element 100, and the output processing unit 260 outputs the same. That is, as illustrated in a sensor output in the drawing, during a period in which the motion is detected, it is output for the region (ROI) in which the motion is detected. Therefore, no image is output during a period in which no motion is detected. In other words, the imaging element 100 is an event-driven imaging element driven by an event of the motion detection.

The pixel adding unit 220 lowers the resolution for the pixel row subjected to the normal imaging at high resolution by the imaging element 100. Furthermore, the pixel reading at low resolution is performed for the pixel row not including the ROI. Therefore, the low-resolution region image processing unit 230 is supplied with the image of the entire region at low resolution. The signal processing is performed on the image of the entire region at low resolution by the low-resolution region image processing unit 230, and this becomes a processing target of motion detection by the motion detection processing unit 240. Therefore, even in a case where a new moving body enters a region other than the immediately preceding ROI, the motion can be detected from the image of the entire region. Furthermore, the motion detection processing unit 240 performs moving body tracking after detecting the motion once, and follows while predicting a region in which the ROI moves in a next image (frame) in time series.

Furthermore, the exposure evaluation value generating unit 250 generates the exposure evaluation value on the basis of the region (ROI) in which the motion is detected. Therefore, high-resolution imaging can be performed with appropriate exposure in the ROI.

[Frame Rate Immediately After Moving Body Detection]

Figure 3:
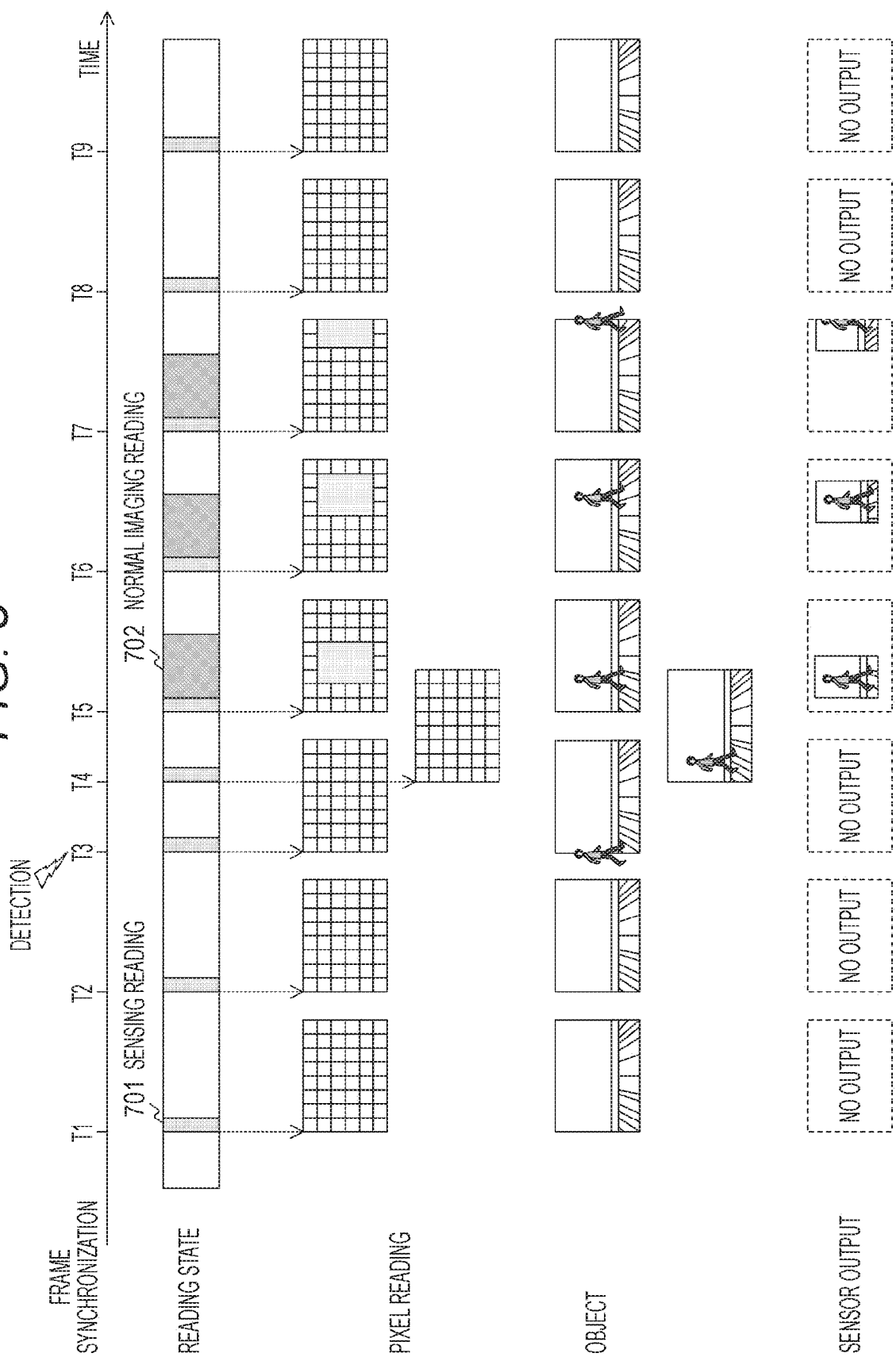
FIG. 3 is a view illustrating a timing example of pixel reading of the imaging device in the embodiment of the present technology.

FIG. 3 is a view illustrating a timing example of the pixel reading of the imaging device in the embodiment of the present technology.

In this example, the moving body is detected in the object from time T3 to time T7. At time T1 and time T2, no motion is detected in the object, so that only sensing reading 701 at low resolution is performed. At that time, the taken image is not output.

When the moving body (person) enters at time T3, the motion detection processing unit 240 detects the same. When the moving body is detected, the sensing imaging is performed at a high frame rate in order to predict the motion of the moving body. That is, the frame rate is doubled between time T3 and time T5. This makes it possible to accurately predict the motion of the moving body, and normal reading 702 at high resolution is performed for the ROI at time T5. The image of the ROI taken in this manner is output via the high-resolution region image processing unit 210 and the output processing unit 260.

Thereafter, the moving body is followed and the image of the ROI is output. During this time, in a case where there is a gap from the predicted region, a predicted trajectory is corrected. When the moving body is no longer detected at time T8, the imaging at high resolution is no longer performed, and no image is output.

FIG. 4 is a view illustrating an example of region prediction in the embodiment of the present technology.

When following the moving body, it is necessary to predict a moving direction and a moving speed of the region. As an example of a method for performing this prediction, first, the gravity center of the moving body is estimated. The gravity center of the moving body may be, for example, coordinates of the center of the region of the moving body, or central coordinates in consideration of weighting by density of a brightness value.

The gravity center of the moving body is similarly estimated in the next frame in time series, and the moving direction and the moving speed of the gravity center of the moving body are estimated from a difference. Therefore, the gravity center of the moving body and the region of the moving body in a next frame after the next can be predicted.

In the above-described example, when the entrance of the moving body is detected at time T3, the gravity center of the moving body and the region of the moving body at time T5 are predicted on the basis of the gravity center of the moving body at time T3 and time T4. As described above, during a period from time T3 to time T5, the imaging is performed at a doubled frame rate, so that the moving body can be quickly followed.

[Moving Speed of Moving Body and Frame Rate]

Figure 5:
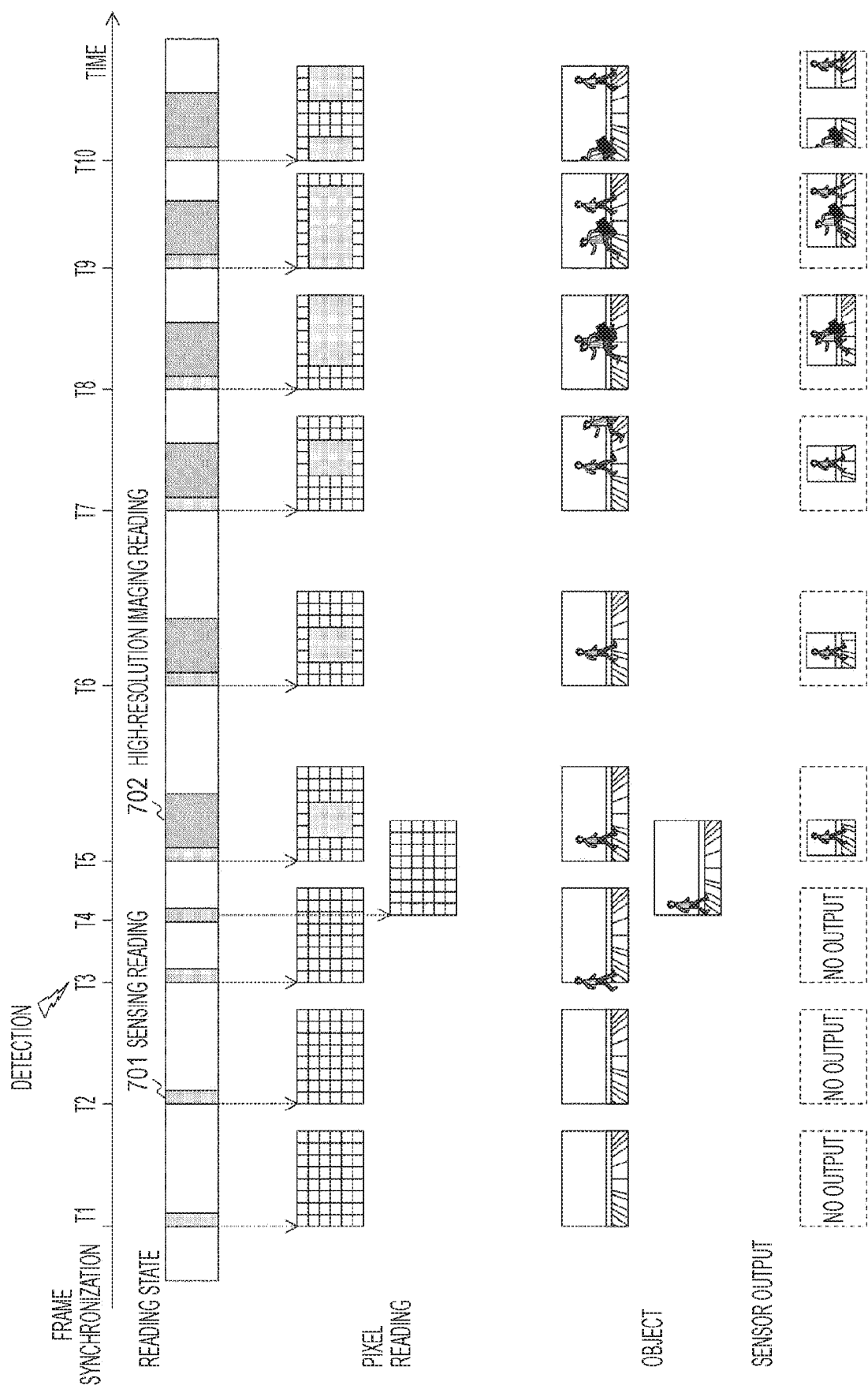
FIG. 5 is a view illustrating another timing example of the pixel reading of the imaging device in the embodiment of the present technology.

FIG. 5 is a view illustrating another timing example of the pixel reading of the imaging device in the embodiment of the present technology. This example illustrates a timing example in a case where the frame rate at the time of imaging at high resolution is dynamically changed.

As is the case with the above-described example, when the moving body is detected at time T3, the sensing imaging is performed at a high frame rate in order to predict the motion of the moving body. Thereafter, when it is determined that the moving speed of the moving body is low, the system control unit 300 controls the imaging element 100 to image at a low frame rate from time T6.

Thereafter, when the new moving body is detected at time T7, the sensing imaging is performed at a high frame rate again in order to predict the motion of the moving body. Then, when it is determined that the moving speed of the new moving body is high, the system control unit 300 controls the imaging element 100 to image at a high frame rate from time T8. In this manner, the frame rate can be dynamically changed in accordance with the moving speed of the moving body.

[In a Case Where a Plurality of Moving Bodies is Detected]

Figure 6:
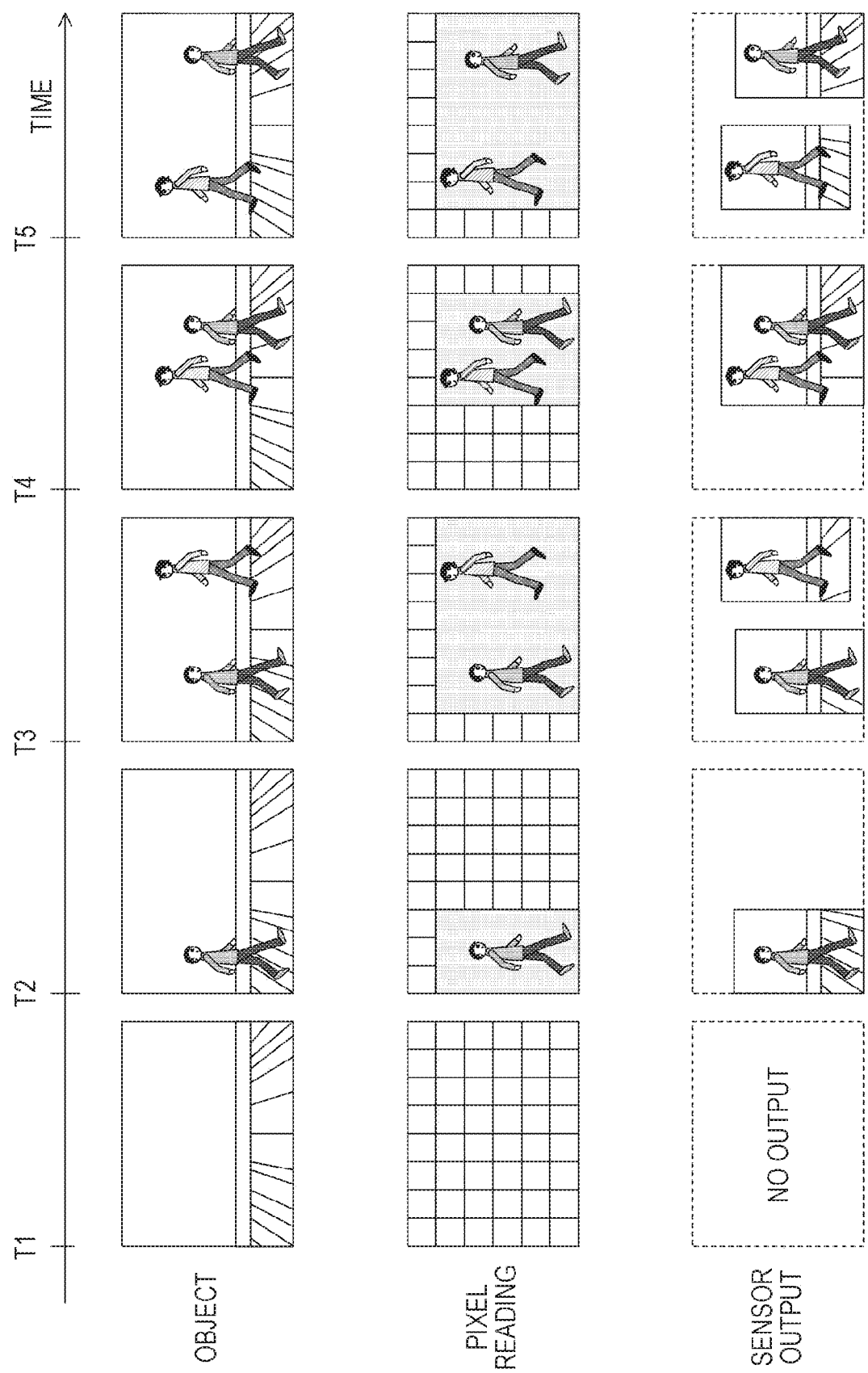
FIG. 6 is a view illustrating an operation example in a case where a plurality of moving bodies is detected in the embodiment of the present technology.

FIG. 6 is a view illustrating an operation example in a case where a plurality of moving bodies is detected in the embodiment of the present technology.

In this example, the moving body is detected in the object at time T2, and thereafter, another moving body is detected at time T3. That is, after time T3, a plurality of moving bodies of different moving speeds and moving directions is present in the object.

In such a case, the imaging element 100 selects a region so as to accommodate all target moving bodies, and performs the pixel reading at high resolution. Then, as illustrated in a sensor output at time T3, the high-resolution region image processing unit 210 cuts out a region in which each moving body is present as the ROI, and outputs a plurality of regions via the output processing unit 260.

However, in a case where a plurality of regions overlaps with each other as illustrated at time T4, a region including both the regions may be cut out as the ROI. Thereafter, when the overlap disappears between the plurality of regions, as illustrated at time T5, separate regions are cut out as the ROIs.

Note that, even in a case where a plurality of regions is made the ROIs in this manner, the exposure evaluation value generating unit 250 generates the exposure evaluation values for the plurality of regions, and the imaging is controlled on the basis of the exposure evaluation values.

[Variation in Which Normal Imaging and Sensing Imaging are Performed for Different Frames]

Figure 7:
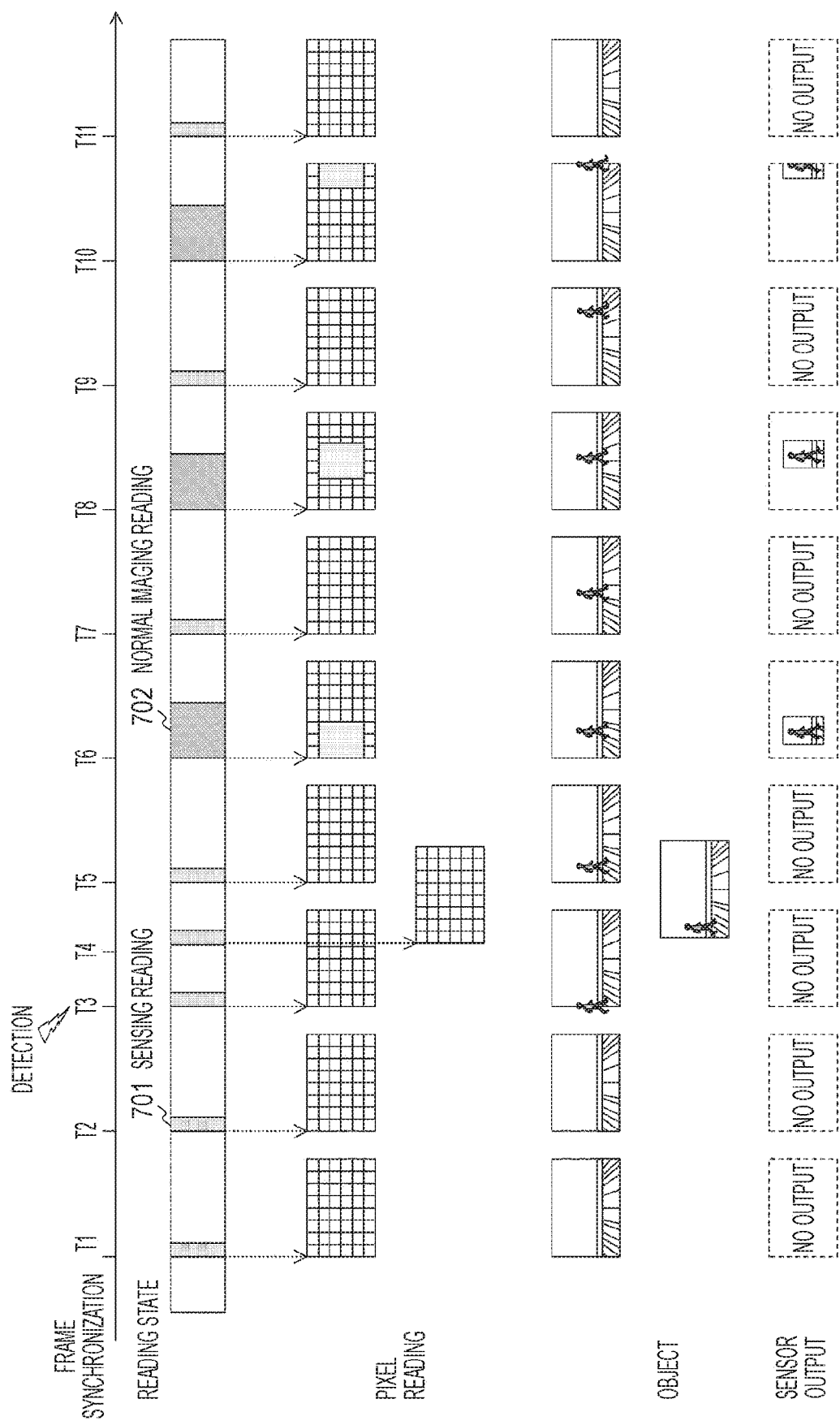
FIG. 7 is a view illustrating an operation example in a case where normal imaging and sensing imaging are performed for different frames in the embodiment of the present technology.

FIG. 7 is a view illustrating an operation example in a case where the normal imaging and the sensing imaging are performed for different frames in the embodiment of the present technology.

In the above-described embodiment, the normal imaging and the sensing imaging are switched for each pixel row in one frame; however, a variation in which such switching is not performed is herein described.

In this variation, the moving body is detected in the object from time T3 to time T11. At time T1 and time T2, no motion is detected in the object, so that only sensing reading 701 at low resolution is performed. At that time, the taken image is not output. Thereafter, when the moving body enters at time T3, the sensing imaging is performed at a high frame rate as in the above-described embodiment.

In this variation, only one of the normal imaging or the sensing imaging is performed in one frame. That is, at time T6, the normal reading 702 at high resolution is performed for the ROI, and the image of the ROI is output via the high-resolution region image processing unit 210 and the output processing unit 260. At following time T7, the sensing reading 701 at low resolution is performed for the entire image. At that time, the image at time T7 is not output.

Thereafter, similarly, at time T8, the normal reading 702 at high resolution is performed for the ROI, and the image of the ROI is output. At subsequent time T9, the sensing reading 701 at low resolution is performed for the entire image, and the image is not output.

According to the operation of this variation, it is possible to repeat the normal imaging and the sensing imaging without switching between the normal imaging and the sensing imaging for each pixel row in one frame. However, the frame rate at which the ROI is output is halved.

[Imaging Control for Each Region]

Figure 8:
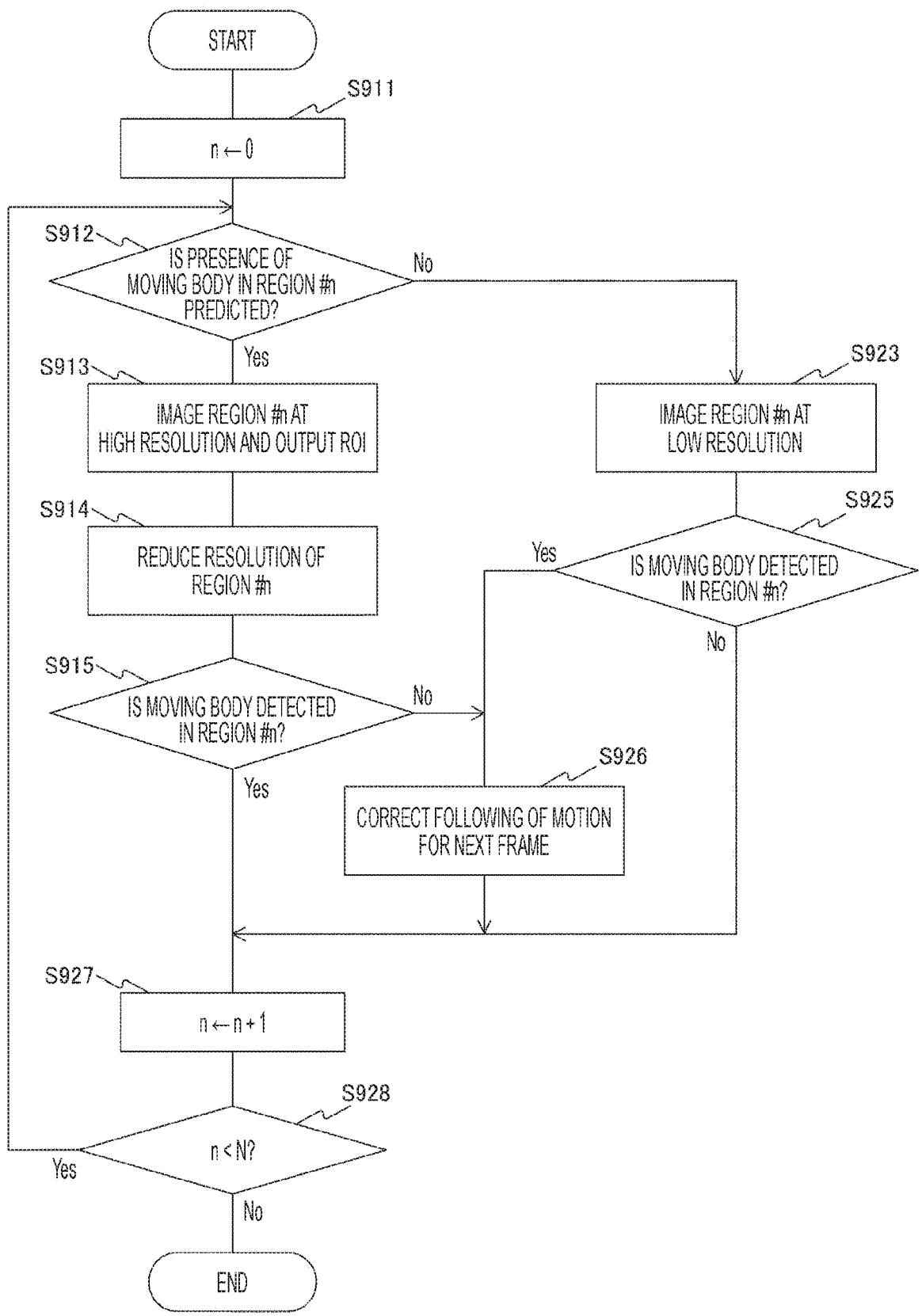
FIG. 8 is a flow chart illustrating an example of determination of imaging control in each region in the image in the embodiment of the present technology.

FIG. 8 is a flow chart illustrating an example of determination of imaging control of each region in the image in the embodiment of the present technology.

In this example, the region in the image is divided into N regions from a region #0 to a region #(N-1), and a content of the imaging control is determined for each region. Here, it is repeatedly determined for each region using a variable n. An initial value of the variable n is "0" (step S911).

When the presence of the moving body is predicted in the region #n (step S912: Yes), the imaging element 100 images the region #n at high resolution, and the imaging signal of the ROI is output via the high-resolution region image processing unit 210 and the output processing unit 260 (step S913). Furthermore, an imaging signal of the region #n imaged at high resolution, the resolution of which is made low by the pixel adding unit 220 (step S914), is supplied to the motion detection processing unit 240 via the low-resolution region image processing unit 230.

At that time, in a case where the moving body is not detected in the region #n (step S915: No), the motion detection processing unit 240 determines that the motion detected so far in the region #n disappears, and corrects motion following for the next frame (step S926). In contrast, in a case where the moving body is detected in the region #n (step S915: Yes), it is determined that there is no change in the detection of the moving body, the variable n is incremented by "1" (step S927), and the procedure shifts to a next region. That is, as long as the variable n is smaller than N (step S928: Yes), the processes after step S912 are repeated.

In a case where the presence of the moving body is not predicted in the region #n (step S912: No), the imaging element 100 images the region #n at low resolution (step S923). The imaging signal of the region #n taken at low resolution is supplied to the motion detection processing unit 240 via the low-resolution region image processing unit 230.

At that time, in a case where the moving body is detected in the region #n (step S925: Yes), the motion detection processing unit 240 determines that the new moving body enters the region #n and corrects the motion following for the next frame (step S926). In contrast, in a case where the moving body is not detected in the region #n (step S925: No), it is determined that there is no change in the detection of the moving body, the variable n is incremented by "1" (step S927), and the procedure shifts to the next region. That is, as long as the variable n is smaller than N (step S928: Yes), the processes after step S912 are repeated.

Note that, the procedure of determining the content of the imaging control for each region is herein described; however, in an actual circuit, the exposure and imaging are performed in units of pixel row. It is hereinafter described in detail.

<3. Circuit>

[First Example of Pixel Driving]

Figure 9:
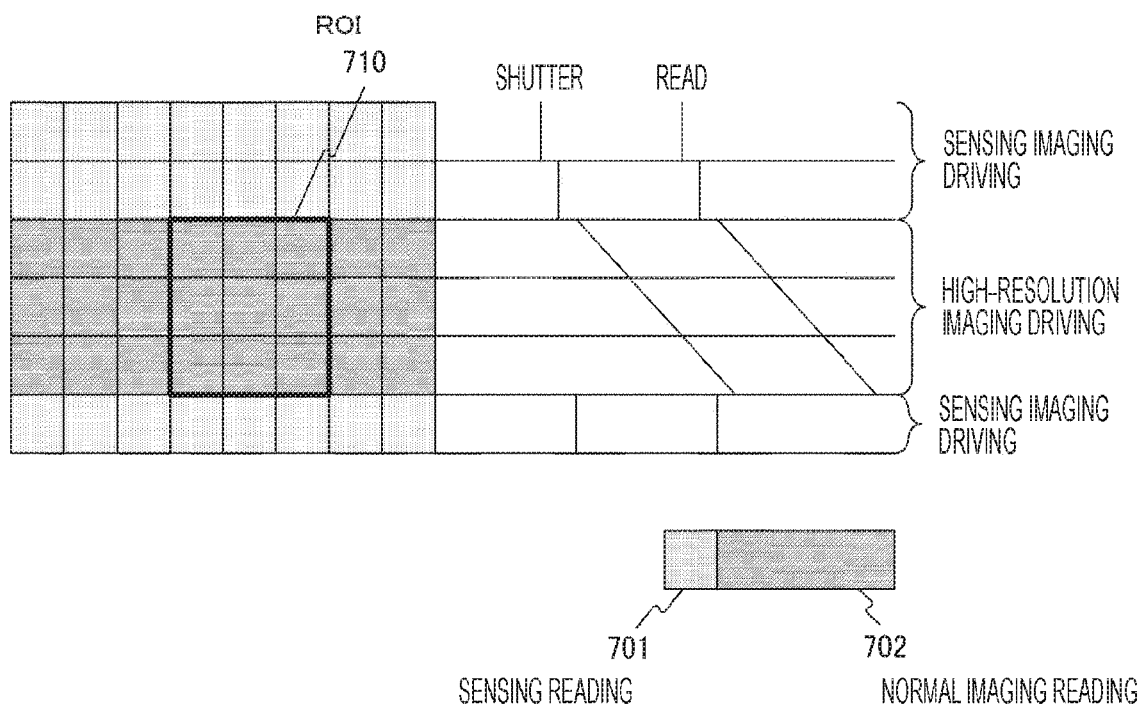
FIG. 9 is a view illustrating a first example of pixel driving in the imaging device in the embodiment of the present technology.

FIG. 9 is a view illustrating a first example of pixel driving in the imaging device in the embodiment of the present technology.

In the first example of the pixel driving, the pixels are driven in units of block row being the line group arranged in the horizontal direction. At that time, the block row including a ROI 710 is driven by high-resolution reading (high-resolution imaging driving). In contrast, the block row not including the ROI 710 is driven by low-resolution reading by pixel addition (sensing imaging driving).

Figure 10:
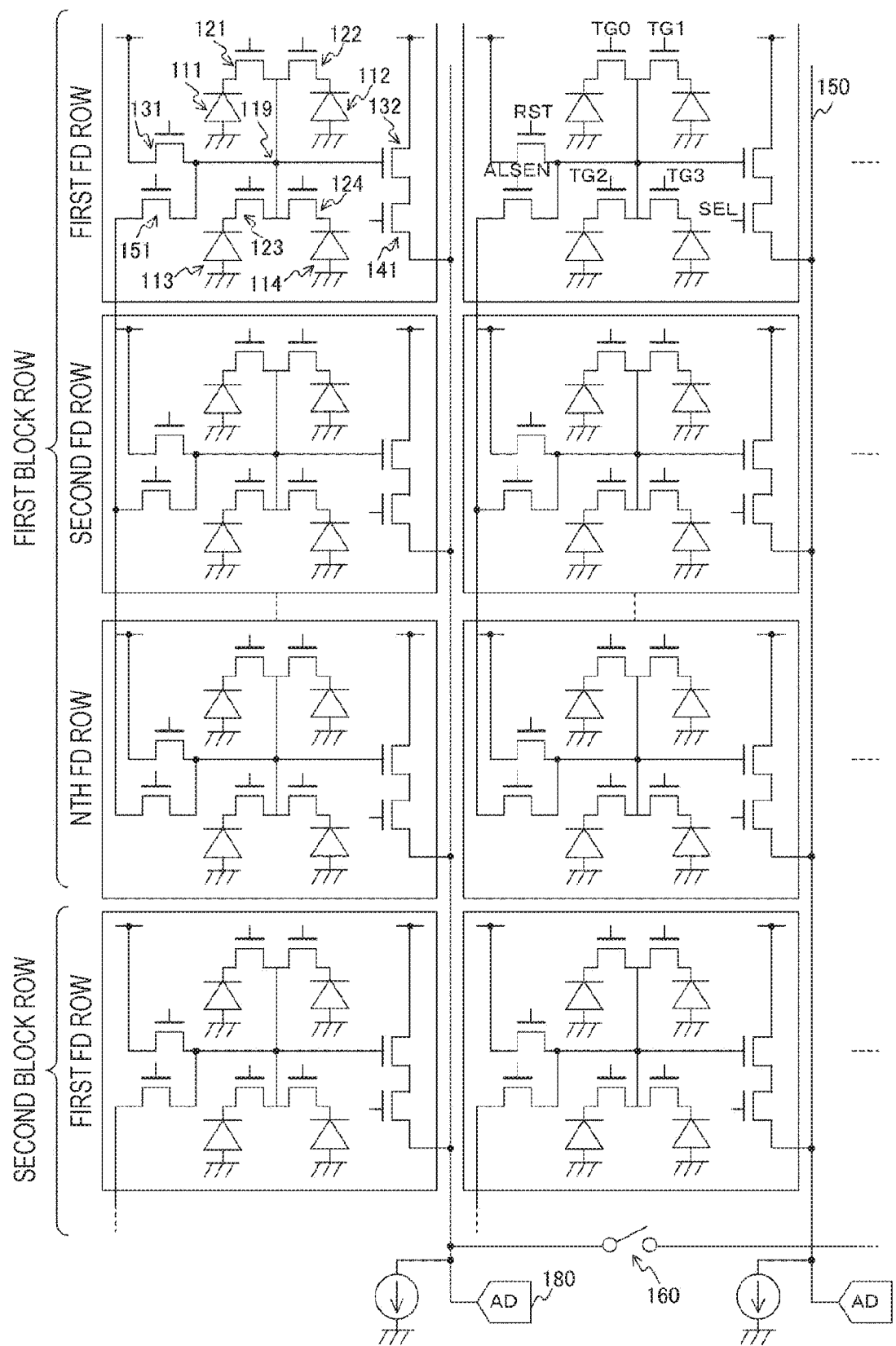
FIG. 10 is a view illustrating an example of a pixel circuit assumed in a first example of the pixel driving in the embodiment of the present technology.

FIG. 10 is a view illustrating an example of a pixel circuit assumed in the first example of the pixel driving in the embodiment of the present technology.

Here, a FD-shared pixel circuit in which a floating diffusion (FD) 119 is shared by four pixels 111 to 114 is assumed. The four pixels 111 to 114 are photodiodes which convert received light into a charge. The FD 119 is a diffusion layer region which converts the charge into a voltage signal.

The four pixels 111 to 114 assigned with colors of a Bayer array, for example, are formed by using a red pixel, a blue pixel, and two green pixels. A line arranged in the horizontal direction in units of four pixels 111 to 114 is referred to as a FD row. Then, N FD rows arranged in the vertical direction is referred to as the block row.

Transfer transistors 121 to 124 are connected to the four pixels 111 to 114, respectively. Transfer gate signals TG0 to TG3 are supplied to gates of the transfer transistors 121 to 124, and transfer to the FD 119 is controlled.

Furthermore, a reset transistor 131 is connected to the FD 119. A reset signal RST is supplied to a gate of the reset transistor 131, and reset of the pixels 111 to 114 and the FD 119 is controlled.

Furthermore, an amplification transistor 132 is connected to the FD 119. The amplification transistor 132 amplifies a voltage signal based on the charges transferred from the pixels 111 to 114 to the FD 119. A selection transistor 141 is connected to the amplification transistor 132. A selection signal SEL is supplied to a gate of the selection transistor 141, and an output to a vertical signal line (VSL) 150 is controlled.

Furthermore, an addition transistor 151 is connected to the FD 119. An addition enable signal ALSEN is supplied to a gate of the addition transistor 151, and therefore, addition of the charges by FD connection in the vertical direction is controlled.

Outputs from the four pixels 111 to 114 are supplied to the vertical signal line 150 for each column, and converted into digital signals by an A/D converter 180. Furthermore, the vertical signal line 150 is selectively connected by a switch 160 so that the addition can be performed in the horizontal direction. That is, in the imaging element 100, the pixel addition by the FD connection in the vertical direction and the pixel addition in the horizontal direction by the switch 160 can be performed at an analog level, and reading at low resolution can be performed by this.

Figure 11:
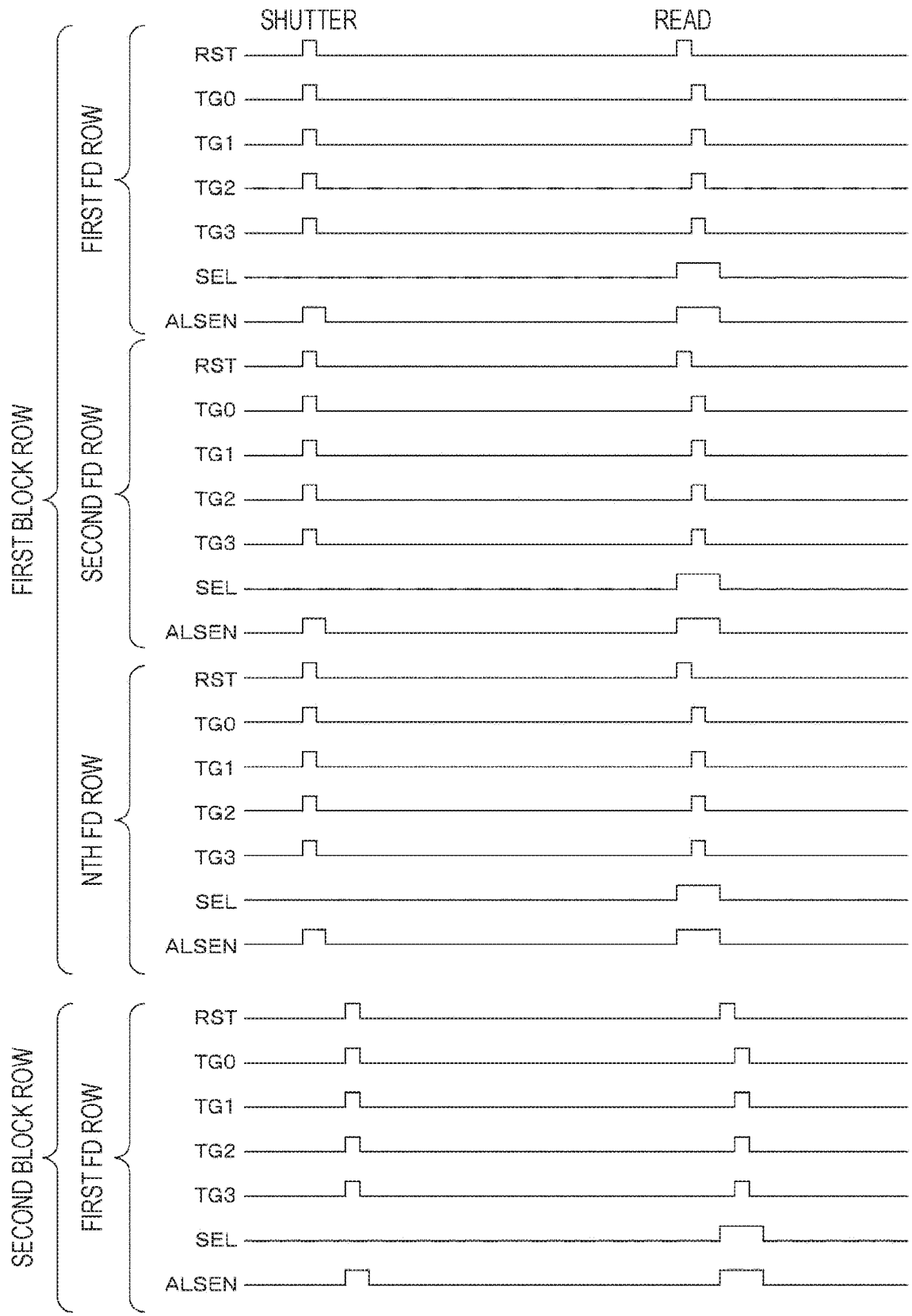
FIG. 11 is a view illustrating a timing example when a block row not including an ROI is read in the first example of the pixel driving in the embodiment of the present technology.

FIG. 11 is a view illustrating a timing example when the block row not including the ROI is read in the first example of the pixel driving in the embodiment of the present technology.

In the first example of the pixel driving, sensing imaging driving is applied to the block row not including the ROI. That is, the pixel addition is performed at the analog level, and the reading at low resolution is performed.

As illustrated in the drawing, a shutter operation is performed simultaneously in all the FD rows in one block row, and the exposure is started. Then, after an exposure period elapses, a read operation is performed simultaneously in all the FD rows in one block row. At that time, the addition enable signal ALSEN is enabled (set to high level), and the pixel addition in the vertical direction of one block row is performed. Furthermore, the switch 160 is put into a conductive state (ON), and the pixel addition in the horizontal direction is performed.

Figure 12:
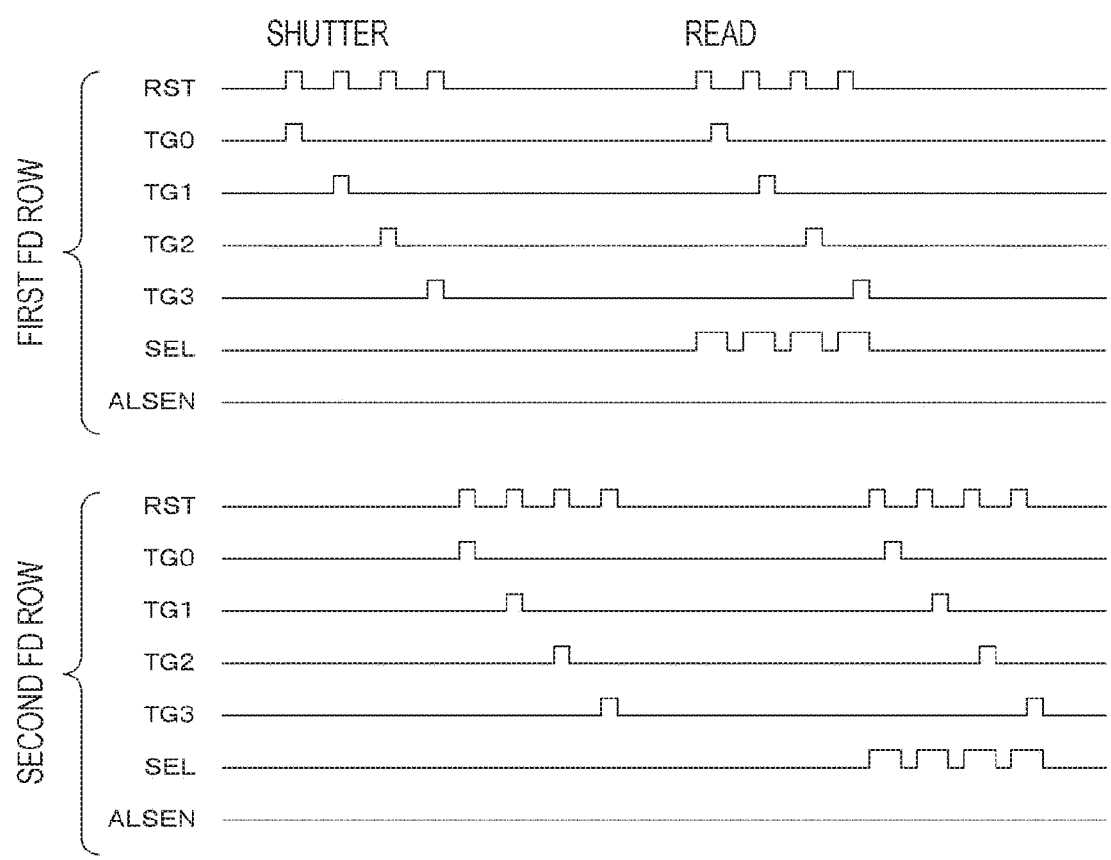
FIG. 12 is a view illustrating a timing example when the block row including the ROI is read in the first example of the pixel driving in the embodiment of the present technology.

FIG. 12 is a view illustrating a timing example when the block row including the ROI is read in the first example of the pixel driving in the embodiment of the present technology.

In the first example of the pixel driving, high-resolution imaging driving is applied to the block row including the ROI. That is, as illustrated in the drawing, the transfer gate signals TG0 to TG3 are enabled (set to high level) with a time shift in the pixels 111 to 114 in the FD row and the exposure is started. Then, reading is performed in each of the pixels 111 to 114 after the exposure period elapses.

In this high-resolution imaging driving, the pixel addition as in the sensing imaging driving is not performed. Therefore, in order to generate the image at low resolution for the motion detection processing unit 240, the resolution is reduced at a digital level by the pixel adding unit 220 of the signal processing unit 200.

[Second Example of Pixel Driving]

Figure 13:
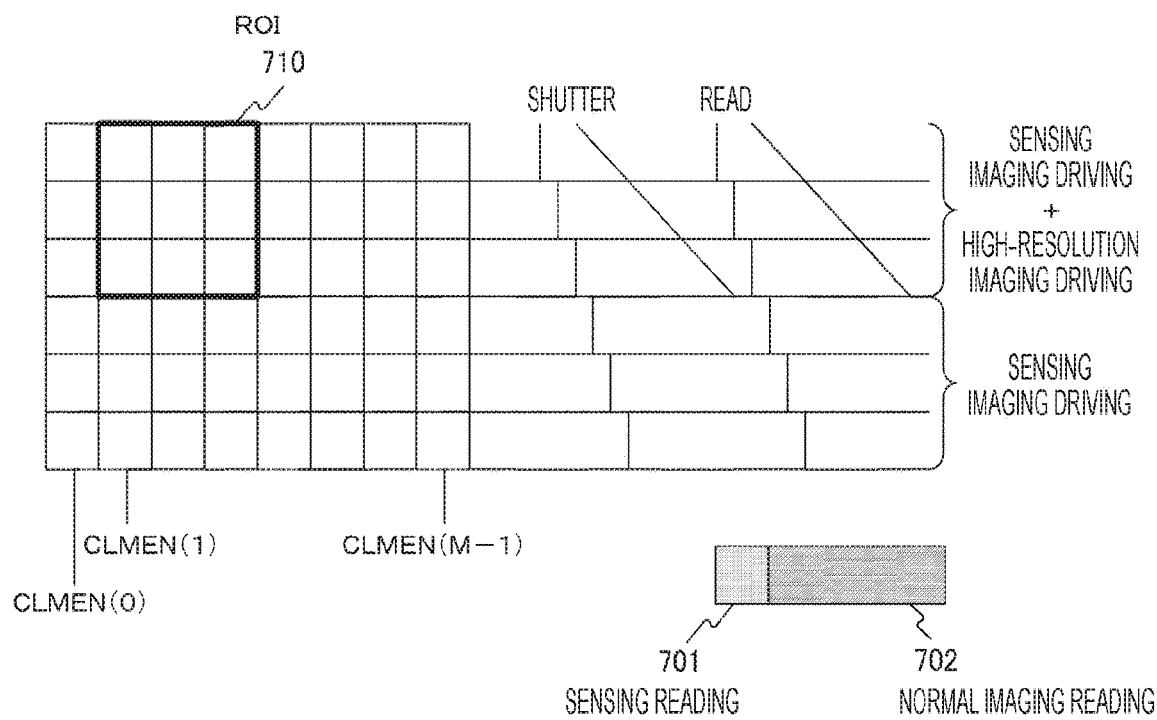
FIG. 13 is a view illustrating a second example of the pixel driving in the imaging device in the embodiment of the present technology.

FIG. 13 is a view illustrating a second example of pixel driving in the imaging device in the embodiment of the present technology.

In the second example of the pixel driving, both the sensing imaging driving and the high-resolution imaging driving are performed at different times for the block row including the ROI 710. At that time, target driving is selected for each block column by a column enable signal CLMEN. Furthermore, in contrast, the sensing imaging driving is performed as in the first example for the block row not including the ROI 710.

Figure 14:
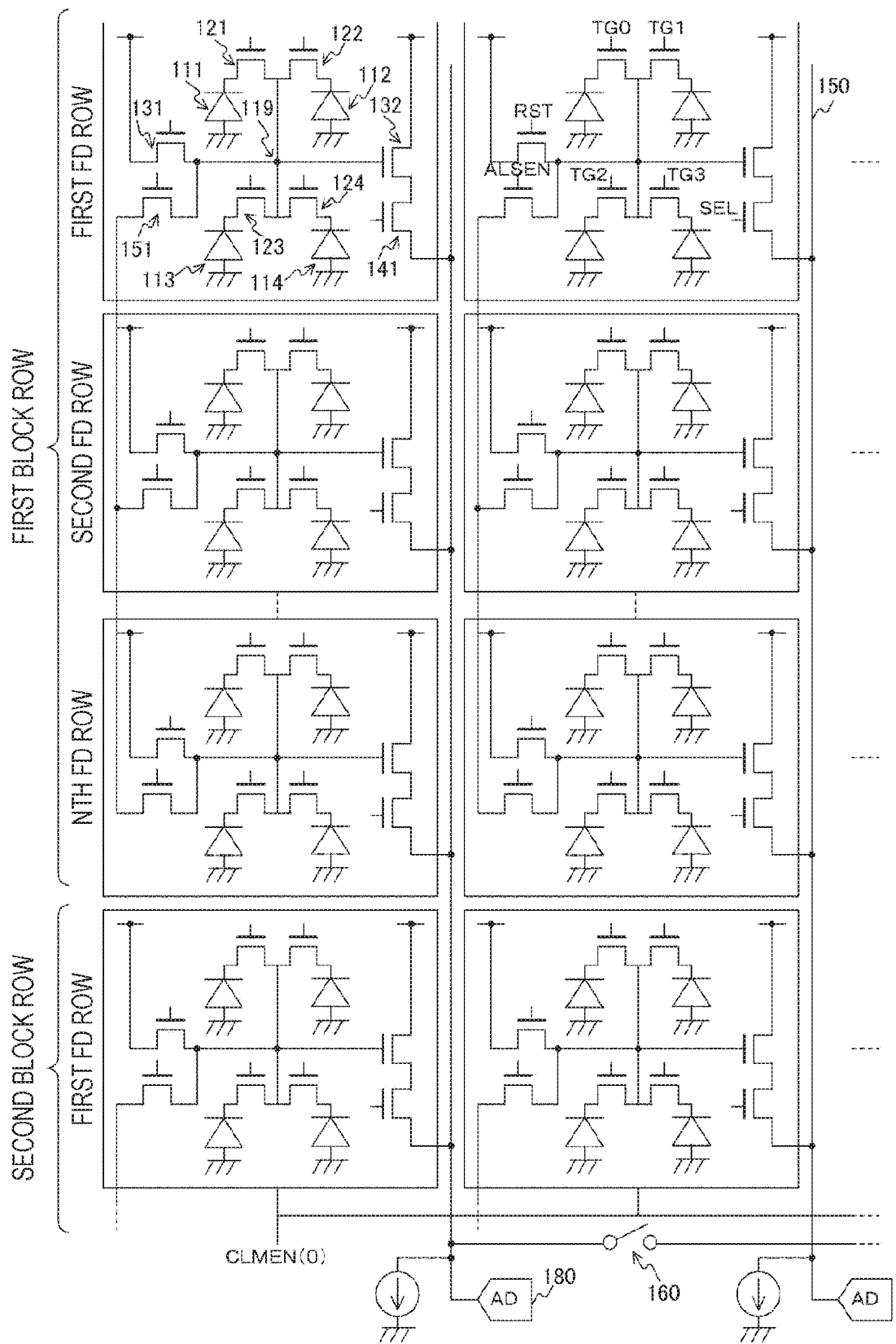
FIG. 14 is a view illustrating an example of a pixel circuit assumed in the second example of the pixel driving in the embodiment of the present technology.

FIG. 14 is a view illustrating an example of a pixel circuit assumed in the second example of the pixel driving in the embodiment of the present technology.

This pixel circuit has a configuration similar to that described in the first example. However, the column enable signal CLMEN is connected to each block column including a pixel column group in the vertical direction, and the driving is controlled for each block column. That is, CLMEN(0) is connected to a first block column, CLMEN(1) is connected to a second block column, and similarly, CLMEN(M-1) is connected to an Mth block column, and it is controlled in units of block column.

Figure 15:
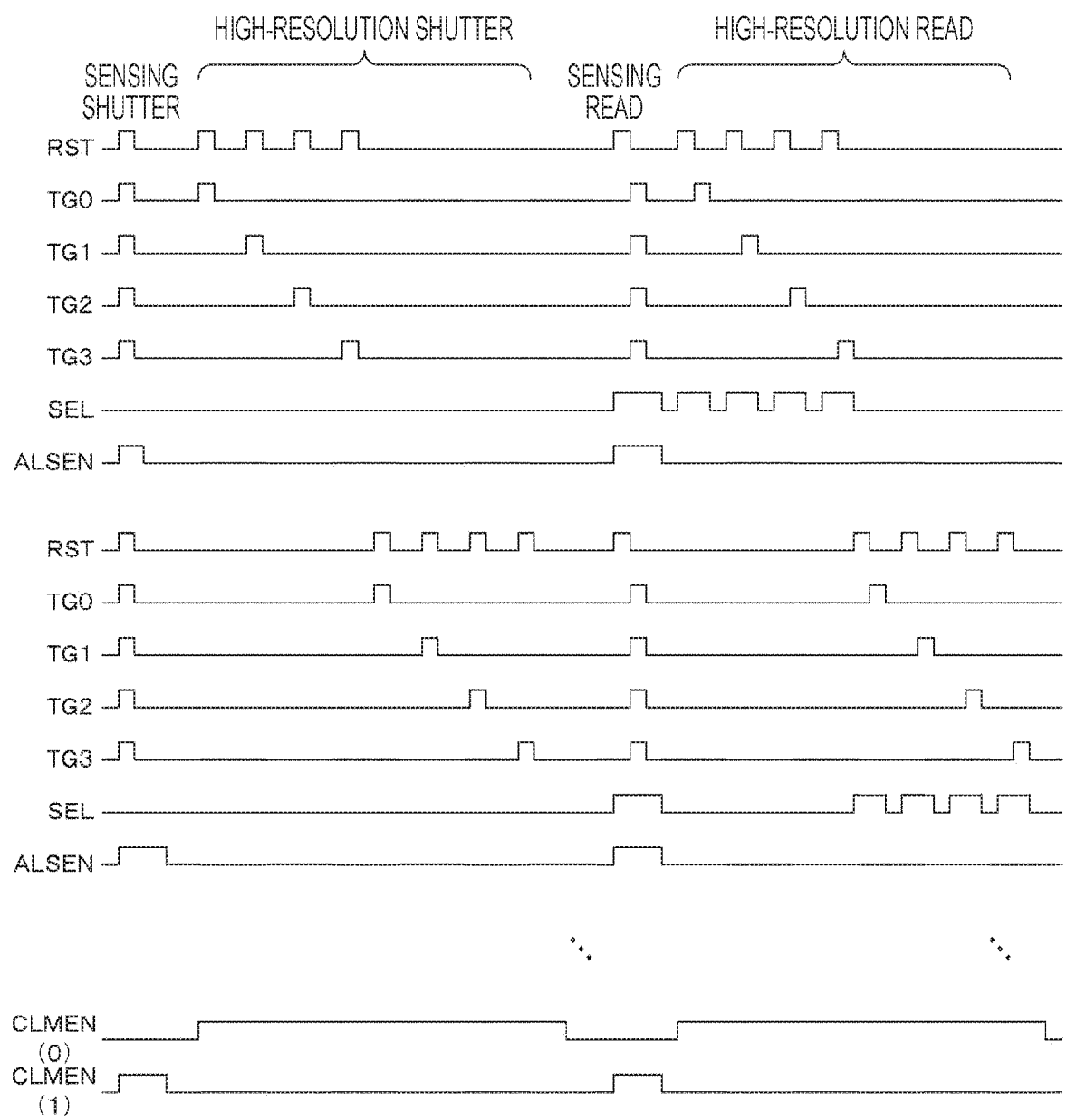
FIG. 15 is a view illustrating a timing example when the block row including the ROI is read in the second example of the pixel driving in the embodiment of the present technology.

FIG. 15 is a view illustrating a timing example when the block row including the ROI is read in the second example of the pixel driving in the embodiment of the present technology.

Here, a case in which the first block column does not include the ROI and the second block column includes the ROI is assumed. Therefore, at a timing of the sensing imaging driving, CLMEN(0) is enabled (set to high level). In contrast, at a timing of high-resolution imaging driving, CLMEN(1) is enabled (set to high level). This makes it possible to select a driving content to be applied for each block column.

Note that, a timing example when reading the block row not including the ROI is similar to that in the above-described first example, so that the detailed description thereof is omitted.

Figure 16:
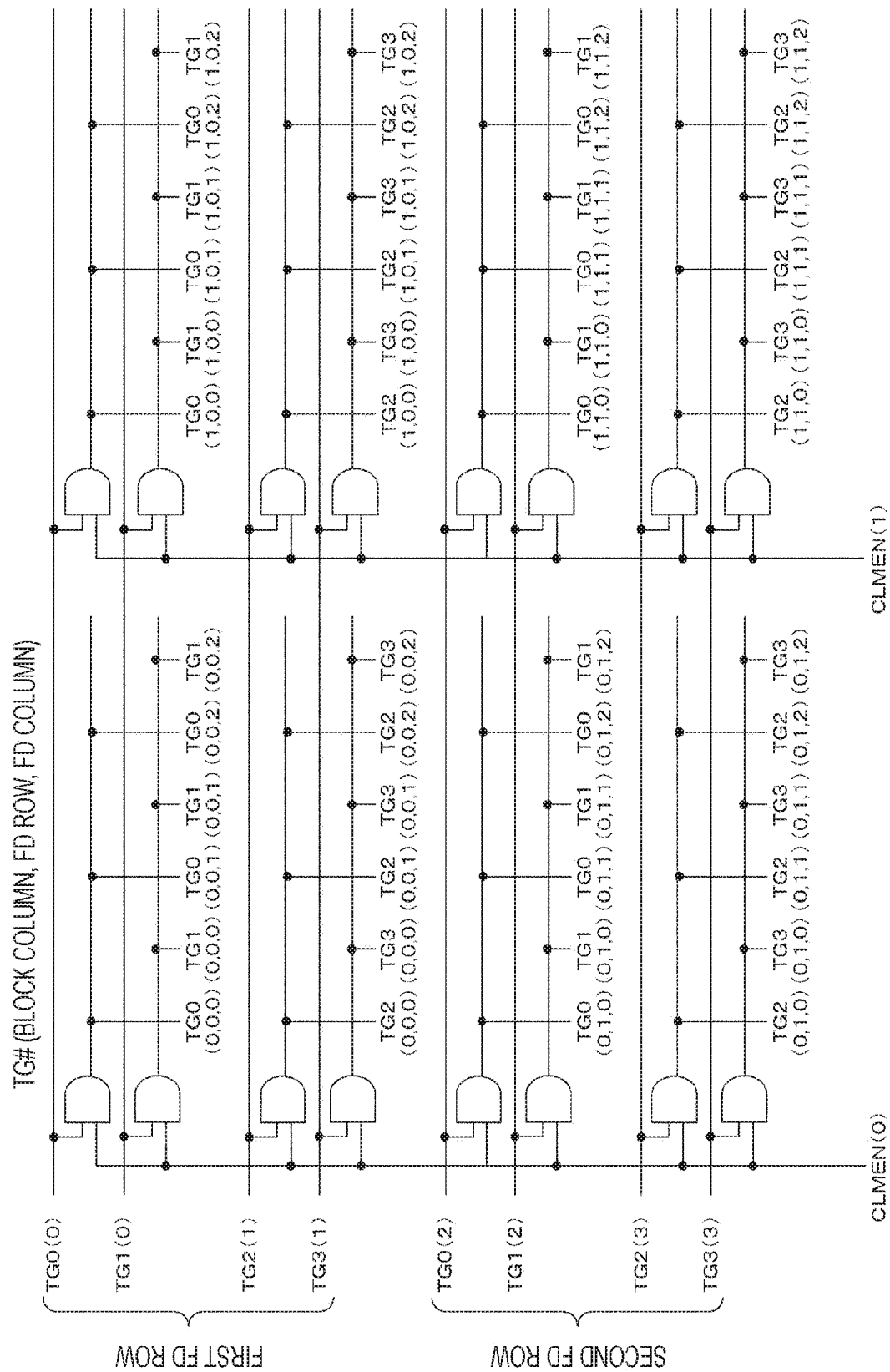
FIG. 16 is a view illustrating an example of a column driving dividing circuit of the pixel circuit assumed in the second example of the pixel driving in the embodiment of the present technology.

FIG. 16 is a view illustrating an example of a column driving dividing circuit of the pixel circuit assumed in the second example of the pixel driving in the embodiment of the present technology.

This column driving dividing circuit is a circuit which generates the transfer gate signals TG0 to TG3 of the FD row according to the column enable signal CLMEN. By generating a logical product of the transfer gate signal of the FD row and the column enable signal, a divided transfer gate signal is generated. Here, the divided transfer gate signal is represented as TG #(block column, FD row, FD column).

[Third Example of Pixel Driving]

Figure 17:
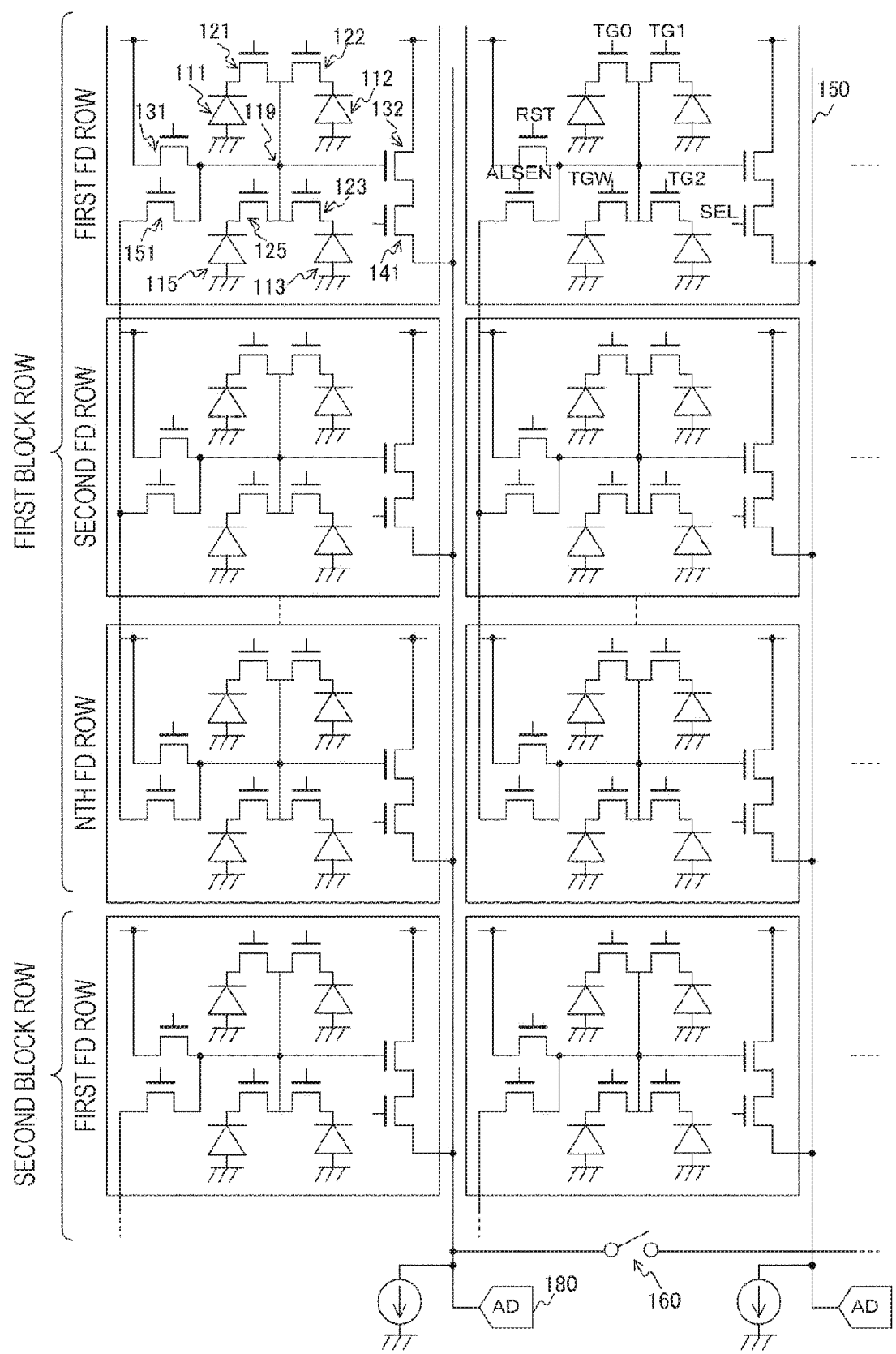
FIG. 17 is a view illustrating an example of a pixel circuit assumed in a third example of the pixel driving in the embodiment of the present technology.

FIG. 17 is a view illustrating an example of a pixel circuit assumed in a third example of the pixel driving in the embodiment of the present technology.

In the above-described first example, the pixel arrangement in the Bayer array is assumed, but in the third example, one of the two green pixels is used as a pixel for sensing addition. The pixel for the sensing addition may be used as the green pixel in the Bayer array as-is, or may be made a white pixel without a color filter. In this example, a pixel 115 for the sensing addition is provided in place of the pixel 114. Furthermore, a transfer transistor 125 is connected to the pixel 115, and a transfer gate signal TGW is supplied to a gate of the transfer transistor 125.

Figure 18:
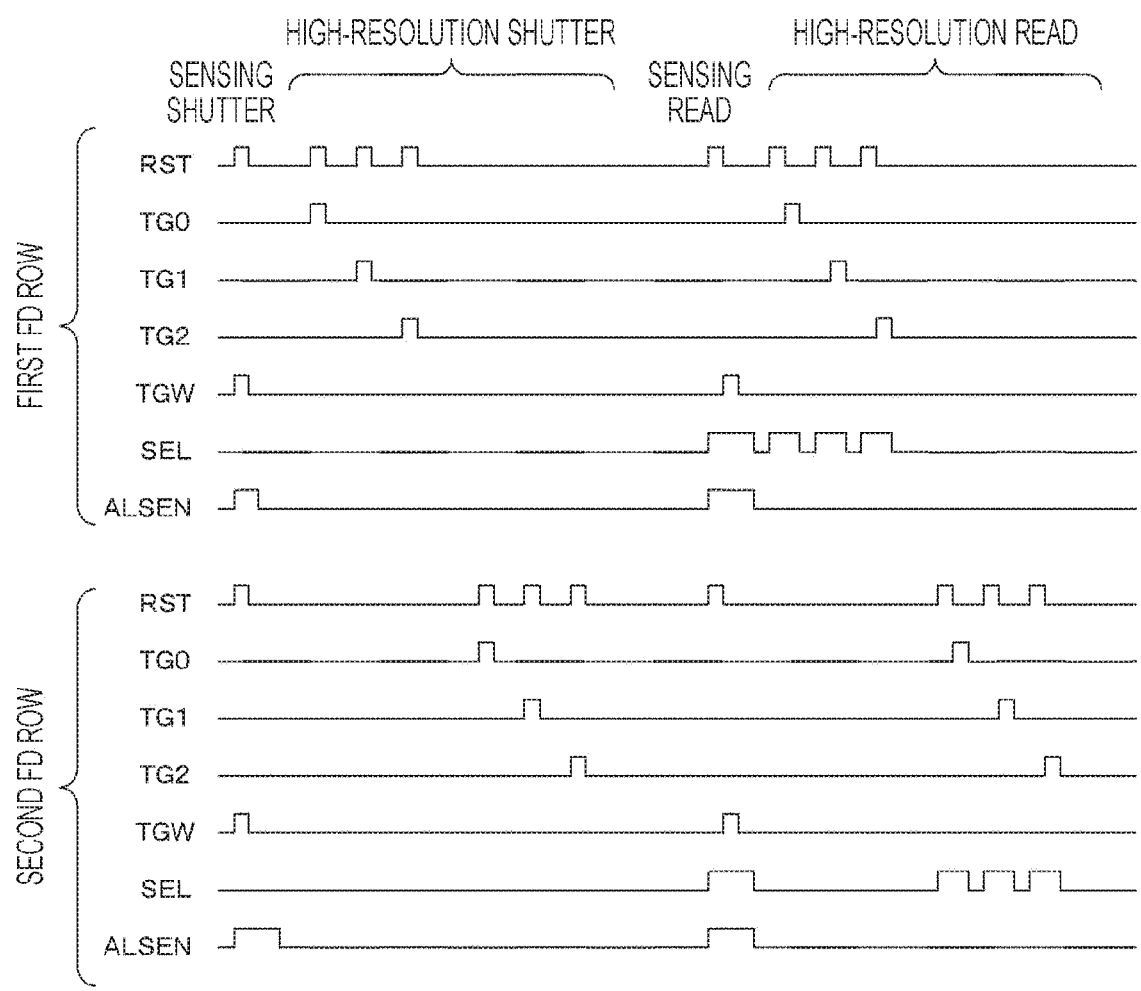
FIG. 18 is a view illustrating a timing example when a block row including the ROI is read in the third example of the pixel driving in the embodiment of the present technology.

FIG. 18 is a view illustrating a timing example when the block row including the ROI is read in the third example of the pixel driving in the embodiment of the present technology.

In the third example of the pixel driving, both the sensing imaging and the high-resolution imaging are performed for the block row including the ROI. That is, at the time of sensing imaging, only TGW is driven, and TG0 to TG2 other than this are not driven. In contrast, at the time of high-resolution imaging driving, TGW is not driven and only TG0 to TG2 other than this are driven. This makes it possible to perform both the sensing imaging and the high-resolution imaging while independently controlling the pixels.

Note that, a timing example when reading the block row not including the ROI is similar to that in the above-described first example, so that the detailed description thereof is omitted.

[Effect]

In this manner, according to the embodiment of the present technology, it is possible to reduce the power consumption of the imaging element 100 by imaging only the region of interest (ROI) at high resolution to output, and taking the entire image at low/high resolution to track the ROI.

Note that, the above-described embodiment describes an example for embodying the present technology, and there is a correspondence relationship between the matters in the embodiment and the matters specifying the invention in claims. Similarly, there is a correspondence relationship between the matters specifying the invention in claims and the matters in the embodiment of the present technology assigned with the same names. However, the present technology is not limited to the embodiment and can be embodied with various modifications of the embodiment without departing from the gist thereof.

Furthermore, the procedures described in the above-described embodiment may be considered as a method including a series of procedures or may be considered as a program for allowing a computer to execute the series of procedures or a recording medium which stores the program. A compact disc (CD), a MiniDisc (MD), a digital versatile disc (DVD), a memory card, a Blu-ray (registered trademark) Disc and the like can be used, for example, as the recording medium.

Note that, the effect described in this specification is illustrative only and is not limitative; there may also be another effect.

Note that, the present technology can also have a following configuration.

(1) An imaging device including:

an imaging element that performs imaging at predetermined resolution for a first pixel row including a predetermined region and performs imaging at resolution lower than the predetermined resolution for a second pixel row other than the first pixel row in a two-dimensional pixel array in which pixel rows arranged in a predetermined direction are arranged in a direction perpendicular to the predetermined direction;

a first image processing unit that generates an image of the predetermined region on the basis of an imaging signal of the first pixel row;

a pixel adding unit that performs an adding process between pixels on the imaging signal of the first pixel row to make resolution the same as resolution of an imaging signal of the second pixel row; and a second image processing unit that generates an image of an entire region on the basis of the imaging signal of the second pixel row and the imaging signal of the first pixel row subjected to the adding process.

(2) The imaging device according to (1) described above, further including:

a motion detection processing unit that detects motion according to a change in time series of the image of the entire region; and a control unit that controls the imaging element to image the first pixel row while making a region in which the motion is detected the predetermined region.

(3) The imaging device according to (2) described above, in which the control unit controls the imaging element to increase a frame rate when a transition is made from a state in which the motion is not detected to a state in which the motion is detected.

(4) The imaging device according to (2) or (3) described above, in which the control unit controls the imaging element to change a frame rate according to a moving speed of the region in which the motion is detected.

(5) The imaging device according to any one of (2) to (4) described above, in which, in a case where a plurality of moving bodies of different moving speeds is detected in the image of the entire region, the control unit controls the imaging element to image the first pixel row while making a region including the moving bodies the predetermined region.

(6) The imaging device according to any one of (2) to (5) described above, further including: an exposure evaluation value generating unit that generates an exposure evaluation value on the basis of the region in which the motion is detected in the image of the entire region, in which the control unit controls the imaging element to perform exposure on the basis of the exposure evaluation value.

(7) The imaging device according to any one of (2) to (6) described above, in which, in a state in which the motion is detected, the imaging element alternately repeats a first frame period in which the imaging at the predetermined resolution is performed for the first pixel row and the imaging is not performed for the second pixel row, and a second frame period in which the imaging is performed at resolution lower than the predetermined resolution for all the pixel rows.

(8) The imaging device according to any one of (2) to (7) described above, in which the imaging element performs the imaging at the predetermined resolution for the first pixel row only in a state in which the motion is detected.

(9) The imaging device according to any one of (1) to (8) described above, further including: an output processing unit that outputs the image of the predetermined region generated by the first image processing unit.

(10) A control method of an imaging element that performs imaging at predetermined resolution for a first pixel row including a predetermined region and performs imaging at resolution lower than the predetermined resolution for a second pixel row other than the first pixel row in a two-dimensional pixel array in which pixel rows arranged in a predetermined direction are arranged in a direction perpendicular to the predetermined direction, the control method including:
a first image processing procedure that generates an image of the predetermined region on the basis of an imaging signal of the first pixel row;
a pixel adding procedure that performs an adding process between pixels on the imaging signal of the first pixel row to make resolution the same as resolution of an imaging signal of the second pixel row; and
a second image processing procedure that generates an image of an entire region on the basis of the imaging signal of the second pixel row and the imaging signal of the first pixel row subjected to the adding process.

REFERENCE SIGNS LIST

100 Imaging element
111 to 115 Pixel (photodiode)
121 to 125 Transfer transistor
131 Reset transistor
132 Amplification transistor
141 Selection transistor
150 Vertical signal line
151 Addition transistor
160 Switch
180 A/D converter
200 Signal processing unit
210 High-resolution region image processing unit
220 Pixel adding unit
230 Low-resolution region image processing unit
240 Motion detection processing unit
250 Exposure evaluation value generating unit
260 Output processing unit
300 System control unit
400 Driving unit

The invention claimed is:

1. An imaging device, comprising:
an imaging element configured to:
image, at a first resolution, for a first pixel row of a plurality of pixel rows which comprises region of interest; and
image, at a second resolution lower than the first resolution, for a second pixel row of the plurality of pixel rows, wherein
the second pixel row is different from the first pixel row,
the plurality of pixel rows is a two-dimensional pixel array,
pixels in each pixel row of the plurality of pixel rows are arranged in a first direction, and
the plurality of pixel rows are arranged in a second direction perpendicular to the first direction; and
circuitry configured to:
generate an image of the region of interest based on a first image signal of the first pixel row;
add at least one pixel for the first pixel row to change the first resolution to the second resolution of a second image signal of the second pixel row; and
generate an image of an entire region based on the second image signal of the second pixel row and the first image signal of the first pixel row subjected to the addition of the at least one pixel.

2. The imaging device according to claim 1, wherein the circuitry is further configured to:
detect motion based on a change in time series of the image of the entire region;
determine a first region as the region of interest based on the detected motion; and
control the imaging element to image the first pixel row in the determined first region.

3. The imaging device according to claim 2, wherein the circuitry is further configured to control the imaging element to increase a frame rate when a transition is made from a state in which the motion is not detected to a state in which the motion is detected.

4. The imaging device according to claim 2,
wherein the circuitry is further configured to control the imaging element to change a frame rate based on a moving speed of the first region in which the motion is detected.

5. The imaging device according to claim 2,
wherein the circuitry is further configured to:
   detect a plurality of moving bodies in a second region of the entire region; and
   control the imaging element to image the first pixel row in the second region.

6. The imaging device according to claim 2, wherein the circuitry is further configured to:
   generate an exposure evaluation value based on the first region in which the motion is detected in the image of the entire region, and
   control the imaging element to perform exposure based on the exposure evaluation value.

7. The imaging device according to claim 2,
wherein the imaging element is further configured to, upon detection of the motion, alternately repeat, a first frame period in which the first pixel row is imaged at the first resolution and the second pixel row is not imaged, and a second frame period in which the plurality of pixel rows are imaged at a resolution lower than the first resolution.

8. The imaging device according to claim 2,
wherein the imaging element is further configured to image, at the first resolution, for the first pixel row only in a state in which the motion is detected.

9. The imaging device according to claim 1, wherein the circuitry is further configured to output the image of the region of interest.

10. An imaging control method comprising:
   imaging, at a first resolution, for a first pixel row of a plurality of pixel rows which comprises a region of interest;
   imaging, at a second resolution lower than the first resolution, for a second pixel row of the plurality of pixel rows, wherein
      the second pixel row is different from the first pixel row,
      the plurality of pixel rows is a two-dimensional pixel array,
      pixels in each pixel row of the plurality of pixel rows are arranged in a first direction, and
      the plurality of pixel rows are arranged in a second direction perpendicular to the first direction;
   generating an image of the region of interest based on a first imaging signal of the first pixel row;
   adding at least one pixel for the first pixel row to change the first resolution to the second resolution of a second imaging signal of the second pixel row; and
   generating an image of an entire region based on the second imaging signal of the second pixel row and the first imaging signal of the first pixel row subjected to the adding of the at least one pixel.

* * * * *